United States Patent [19]
Halsey et al.

[11] Patent Number: 5,969,452
[45] Date of Patent: Oct. 19, 1999

[54] MAGNETIC BEARING CONSTRUCTION

[75] Inventors: David G. Halsey; David W. Okey, both of Rockford, Ill.

[73] Assignee: Sundstrand Corporation, Rockford, Ill.

[21] Appl. No.: 09/192,055

[22] Filed: Nov. 13, 1998

[51] Int. Cl.$^6$ .................................................. H02K 7/09
[52] U.S. Cl. ......................... 310/90.5; 310/216; 310/217
[58] Field of Search .................................. 310/90.5, 216, 310/217, 154, 254

[56] References Cited

U.S. PATENT DOCUMENTS

| | | | |
|---|---|---|---|
| 3,988,623 | 10/1976 | Yamaguchi et al. | 310/154 |
| 4,225,799 | 9/1980 | Bishai | 310/154 |
| 4,338,533 | 7/1982 | Gräfenschnell | 310/154 |
| 4,973,871 | 11/1990 | Bisantz | 310/154 |
| 5,300,843 | 4/1994 | Lyons et al. | 310/90.5 |
| 5,572,079 | 11/1996 | Pinkerton | 310/90.5 |
| 5,578,880 | 11/1996 | Lyons et al. | 310/90.5 |
| 5,619,084 | 4/1997 | Lau | 310/154 |
| 5,679,992 | 10/1997 | Miyamoto et al. | 310/90.5 |
| 5,729,066 | 3/1998 | Soong et al. | 310/90.5 |

*Primary Examiner*—Clayton LaBalle
*Assistant Examiner*—Saeed Ghahramani
*Attorney, Agent, or Firm*—Wood, Phillips, VanSanten, Clark & Mortimer

[57] ABSTRACT

A magnetic bearing (10) is provided for supporting a rotor (12) for rotation about an axis (14). The magnetic bearing (10) includes a plurality of actuator cores (16) spaced circumferentially about the axis (14), and a plurality of non-magnetic spacers (18A, 18B). Each of the cores (16) has a pair of circumferentially spaced end surfaces (28). Each of the spacers (18A, 18B) is positioned between the end surfaces (28) of adjacent pairs of the cores (16) and has an interference fit with the end surfaces (28) to form a circumferentially preloaded ring (19) of the cores (16) and spacers (18A, 18B) centered on the axis (14). At least one of the non-magnetic spacers is a multi-piece assembly (18A) including a shim (32, 49) having a width selected to provide the circumferential preload within a predetermined range.

10 Claims, 2 Drawing Sheets

MAGNETIC BEARING CONSTRUCTION

FIELD OF THE INVENTION

This invention relates to magnetic bearings, and more particularly, to the construction of a magnetic bearing.

BACKGROUND OF THE INVENTION

Magnetic bearings for supporting a rotor for rotation about an axis are well known in the art. Commonly, such bearings have one or more pairs of magnetic actuator cores that are assembled to form a ring centered on the axis of rotation. Typically, each of the actuator cores is formed from a stack of thin laminations of magnetic material, which serve to reduce eddy currents in the magnetic bearing. In some applications, magnetic isolation may be required between each of the actuator cores in the assembled ring. Magnetic isolation has been accomplished in the past by the insertion of non-magnetic spacers between each of the cores. The non-magnetic spacers are then welded to the cores to form the assembled ring of cores and non-magnetic spacers. The outside and inside diameters of the assembled ring are then ground to provide the accuracy required for satisfactory operation of the magnetic bearing. While such constructions have worked well for their intended purpose, there is room for improvement.

For example, each weld joining a non-magnetic spacer to one of the actuator cores is in reality a plurality of lamination to spacer welds, which may require additional inspection, thereby increasing manufacturing time and cost. Further, some laminations may be magnetically and electrically shorted together in the weld zone, thereby reducing the performance of the magnetic bearing. Additionally, material properties of the non-magnetic spacers and the actuator cores may be affected by the heat of the welding operation. Further, volatile materials trapped between the laminations of the actuator cores may prevent achievement of the vacuum environment required for some welding methods. To overcome this, extraordinary cleaning of a large number of laminations may be required, thereby further increasing manufacturing time and cost.

SUMMARY OF THE INVENTION

It is the principal object of the invention to provide a new and improved construction for a magnetic bearing.

It is another object of the invention to provide magnetic isolation in a magnetic bearing without necessarily requiring welding of non-magnetic spacers to the actuator cores of the magnetic bearing.

According to one facet of the invention, an exemplary embodiment of the invention achieves at least some of the foregoing objects in a magnetic bearing for supporting a rotor for rotation about an axis. The magnetic bearing includes a plurality of actuator cores spaced circumferentially about the axis, and a plurality of non-magnetic spacers. Each of the cores has a pair of circumferentially spaced end surfaces. Each of the spacers is positioned between the end surfaces of adjacent pairs of the cores and has an interference fit with the end surfaces to form a circumferentially preloaded ring of the cores and spacers centered on the axis. At least one of the non-magnetic spacers is a multi-piece assembly including a shim having a width selected to provide the circumferential preload within a predetermined range.

According to one facet of the invention, each of the end surfaces nominally lies in a corresponding radial plane containing the axis.

According to another facet of the invention, the shim has a pair of side surfaces which are parallel to one another.

According to one facet of the invention, the shim has a pair of parallel side surfaces spaced by a circumferential width, and the multi-piece assembly further includes a pair of spacer pieces, with each spacer piece having a first surface circumferentially spaced from a second surface. Each of the first surfaces mates with one of the end surfaces. Each of the second surfaces mates with one of the side surfaces.

According to another facet of the invention, each of the spacers in the cores have circumferential stiffnesses of the same magnitude.

In yet another facet of the invention, the shim is a cylindrical pin.

In one facet of the invention, the multi-piece assembly further includes a pair of spacer pieces, with each spacer piece having a first surface circumferentially spaced from the second surface. The first surface mates with one of the end surfaces. The second surface includes a groove that receives the shim in the form of a cylindrical pin.

Other objects and advantages will become apparent from the following specification taken in connection with the accompanying drawings.

DETAILED DESCRIPTION OF THE PREFERRED EMBODIMENTS

Figure 1:
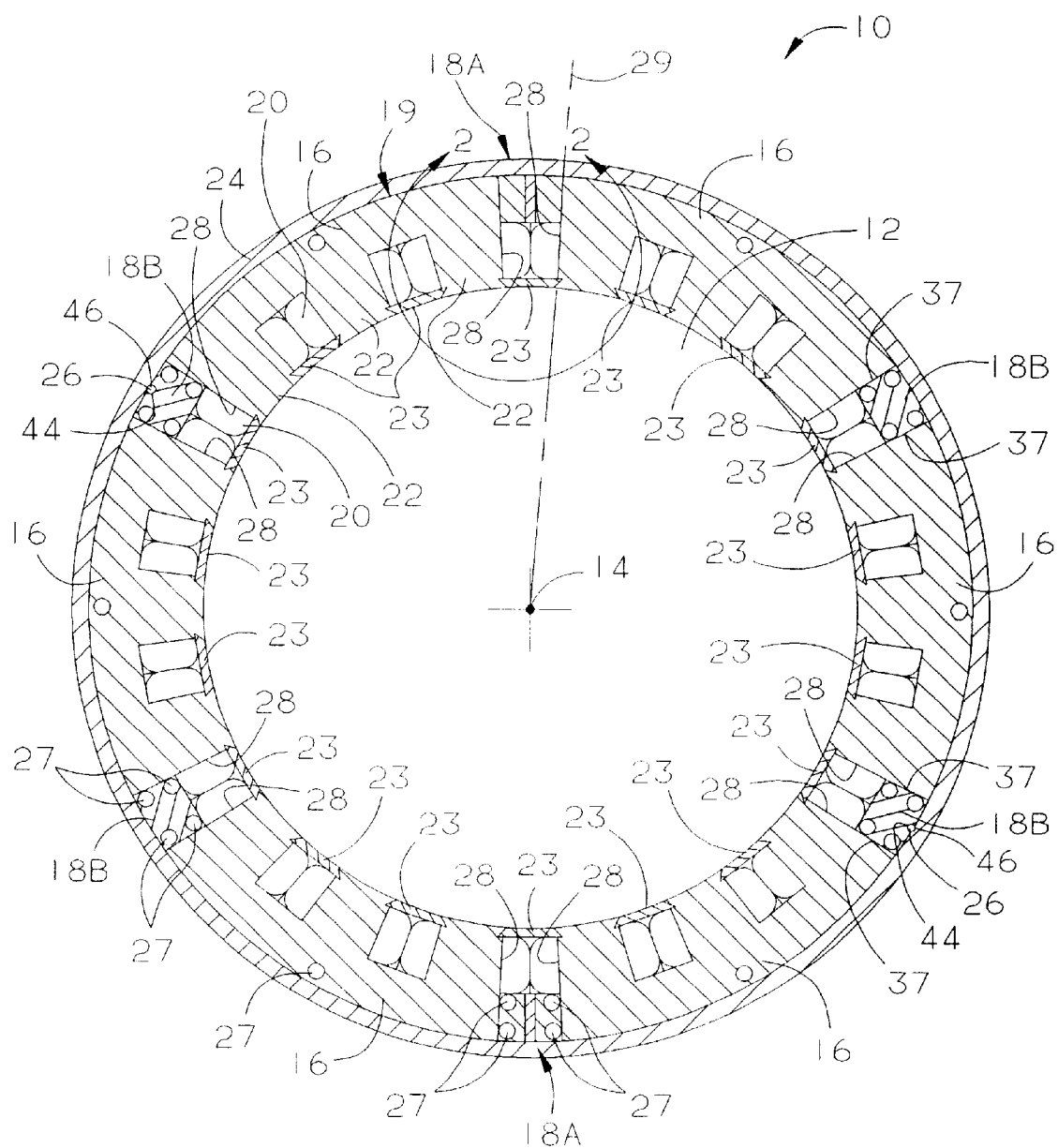
FIG. 1 is a sectional view of one embodiment of a magnetic bearing made according to the invention.

As seen in FIG. 1, a magnetic bearing 10 is provided for supporting a rotor 12 for rotation about an axis 14. The magnetic bearing 10 includes a plurality of magnetic actuator cores 16 and a plurality of non-magnetic spacers 18A and 18B spaced between the magnetic actuator core 16 and having interference fits therewith to form a circumferentially preloaded ring 19 of the actuator cores 16 and spacers 18A, 18B centered on the axis 14. The magnetic bearing 10 further includes a plurality of electrical coils 20, with each coil 20 wound around a pole 22 of one of the magnetic actuator cores 16; a plurality of coil shields 23 mounted between the cores 16 to protect the coils 20; a cylindrical mount ring 24 surrounding the actuator cores 16 and spacers 18A and 18B; and a pair of pins 26, with each of the pins 26 engaged between the mount ring 24 and one of the spacers 18B. Cooling passages 27 may optionally be provided in any, or all, of the cores 16 and spacers 18A and 18B. The components 16, 18A, 18B, 24, 26, and 27 have lengths extending parallel to the axis 14, preferably with substantially constant cross-sections throughout their lengths. However, it will be readily apparent to those of ordinary skill in the art that there are many other constructions with non-constant cross-sections that can be used for the bearing 10.

The plurality of actuator cores 16 are spaced circumferentially about the axis 14. Each of the cores 16 has a pair of circumferentially spaced end surfaces 28, each of which nominally lies in a radial plane containing the axis 14, such as shown by dashed line 29. In the illustrated embodiment, each of the actuator cores 16 includes three of the poles 22 spaced circumferentially about the axis 14. However, the number, configuration, and arrangement of poles 22 on each of the cores 16 is not critical to the invention, and accordingly, the invention contemplates actuator cores 16 having any number, configuration, or arrangement of poles 22. For example, a core 16 could be provided with only two of the poles 22 that are axially spaced, rather than circumferentially. Similarly, while in a highly preferred embodiment each of the actuator cores 16 is formed from an axial stack of laminations made of magnetic material, the actuator cores 16 may be of any suitable construction, many of which are well known.

Figure 2:
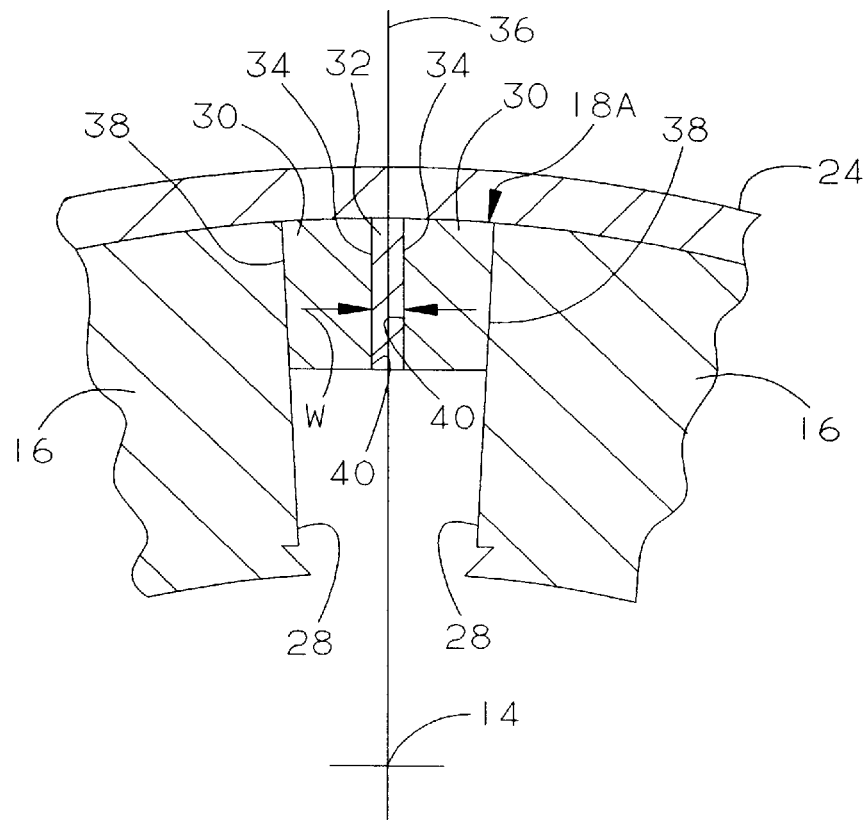
FIG. 2 is an enlarged fractional view of selected components in the area indicated by line 2—2 in FIG. 1.

As best seen in FIG. 2, each of the spacers 18A is a multi-piece assembly that includes a pair of spacer pieces 30 and a shim or a stack of shims 32. As best seen in FIG. 1, each of the spacers 18B is a unitary piece. The spacers 18A and 18B are inserted between the cores 16, with the shims 32 having widths W selected to provide a circumferential preload between the cores 16 and the spacers 18A, 18B within a predetermined range. Preferably, for the embodiment shown in FIG. 2, the shim 32 includes a pair of side surfaces 34 that are spaced by the width W and are nominally parallel to each other and to a radial plane that contains the axis 14 and bisects the shim 32, as illustrated by the dashed line 36. Each of the spacers 18B has a pair of circumferentially spaced surfaces 37. Each of the spacer pieces 30 has a pair of circumferentially spaced surfaces 38 and 40. Each of the surfaces 37, 38 is nominally parallel to and matingly abuts one of the end surfaces 28 of the cores 16 and each of the surfaces 40 is nominally parallel to and matingly abuts one of the side surfaces 34 of the shims 32.

It should be understood that the shims 32 can be provided in a range of widths W from which the appropriate width W can be selected to provide the circumferential preload within the predetermined range. The range of widths W that should be provided for the shims 32 is dependent upon the manufacturing tolerances for the surfaces 28 on the cores 16, the surfaces 38, 40 on the spacer pieces 30, and the surfaces 37 of the spacers 18B. Further, it should be understood that the parallelism of the surfaces 40 to the surfaces 34 will be dependent upon the selected width W of the shim 32. The greater the range of available widths W for the shims 32, the greater the possibility that the surfaces 40 will not be absolutely parallel to the surfaces 34. By providing two of the spacers 18A, the range of widths W is reduced approximately in half because two shims 32 are available to correct for the manufacturing tolerances of the cores 16, the spacers 18B, and the spacer pieces 30. However, it should be understood that depending upon the particular application and on the manufacturing tolerances, a suitable magnetic bearing 10 may be provided with a single spacer 18A. On the other hand, other applications may require more than two of the spacers 18A. Accordingly, the invention contemplates magnetic bearings 10 having one or more of the spacers 18A, as dictated by the particular application for the bearing 10 and the manufacturing tolerances selected for the components of the magnetic bearing 10.

It should be appreciated that by providing the shims 32 with the parallel side surfaces 34, the selected width W of the shims 32 can be attained with a high degree of accuracy by using a relatively simple, flat surface grinding operation.

While it is preferred that the surfaces 34 and 40 be parallel to the plane illustrated by dashed line 36 and that the surfaces 28, 37, and 38 lie in one of the radial planes illustrated by dashed line 29, the invention contemplates any other orientations for the surfaces 28, 34, 37, 38, and 40 that will create circumferentially preloading in the ring 19 in the assembled state. For example, the cores 16 and the spacers 18 could be configured so that all of the surfaces 28, 34, 37, 38, and 40 lie in radial planes containing the axis 14.

The mount ring 24 contains the cores 16 and the spacers 18A and 18B, and preferably has an interference fit with the outside surfaces of the cores 16 and the spacers 18A and 18B sufficient to retain the mount ring 24 to the assembled ring 19 during assembly of the magnetic bearing 10 into a housing that mounts the bearing 10. As seen in FIG. 1, each of the pins 26 is received in semicircular grooves 44 and 46 that are formed in the ring 24 and the spacers, 18B, respectively, extending parallel to the axis 14. The ring 24 serves to react radial compression forces that are generated if the magnetic bearing 10 is interference fit into a receiving bore in a housing that mounts the bearing 10, thereby reducing the radial compression forces on the cores 16 and the spacers 18A and 18B that would result if the ring 24 were not used. The ring 24 also serves to insure that the ring 19 remains in the assembled state prior to the bearing 10 being assembled into a housing. The ring 24 can also serve to provide assembly features for higher assembly levels. For example, the ring could provide a bolt flange that would be used to mount the bearing 10 to a housing. The pins 26 and the grooves 44, 46 serve as keys and keyways, respectively, to restrict rotation of the bearing cores 16 and the spacers 18A and 18B relative to the ring 24 during operation. In this regard, it should be noted that one of the pins 26 is redundant to the other of the pins 26 in the illustrated embodiment. It should be appreciated that by providing at least one of the spacers 18A in each circumferential span between the pins 26, a circumferential preload is provided in each of the circumferential spans regardless of any circumferential loads that may be reacted by the pins 26 into the ring 24. It should also be understood that, while the ring 24 is preferred, not all constructions of magnetic bearing 10 may require the ring 24. Similarly, while the pins 26 and grooves 44, 46 are preferred, any suitable structure may be used to restrict rotation of the bearing cores 16 and the spacers 18A and 18B relative to a housing that mounts the bearing 10.

Figure 3:
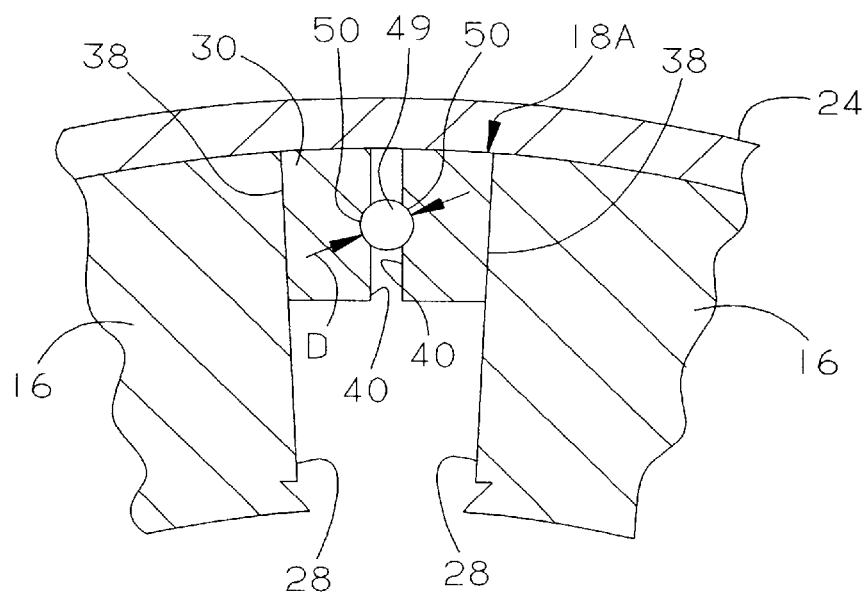
FIG. 3 is a view similar to FIG. 2, but showing another embodiment of a magnetic bearing made according to the invention.

FIG. 3 illustrates another embodiment of the magnetic bearing 10 and the spacers 18A. This embodiment is identical to the embodiment discussed in connection with FIGS. 1 and 2, except that the shim 32 is provided in the form of a cylindrical pin shim 49 that is received in respective semicircular grooves 50 provided in the surfaces 40 of each of the spacer pieces 30. The pin shim 49 and the grooves 50 preferably extend parallel to the axis 14. The width W of the pin shim 49 is defined by the diameter D of the pin shim 49. Again, a range of pin diameters D can be provided for the pin shim 49 to allow easy selection of the appropriate width W to achieve the circumferential preload of the ring 19 within the predetermined range. Preferably, the semicircular cross-section of the grooves 50 have a radius that is selected to nominally conform to the largest anticipated diameter D of the pin shim 49. While it is preferred that the grooves 50 extend parallel to the axis 14, the grooves may have any orientation relative to the axis 14 that will create circumferential loading in the ring 19 when the pin shim 49 is received in the grooves 50. It will be appreciated that because the circumferential preload is created by contact between the pin shim 49 and the grooves 50, the precise shape and orientation of the remainder of each of the surfaces 40 is only critical to the extent that the surfaces 40 do not interfere with each other in the assembled state. It should also be appreciated that the circular cross-section of the pin shim 49 and the semi-circular cross-section of the grooves 50 allow the spacer pieces 30 to be self-aligning so that the surfaces 38 align parallel to the surfaces 28 of the cores 16.

Preferably, the cores 16 and the spacers 18A and 18B have circumferential stiffnesses of the same magnitude to provide an inward radial stiffness for the bearing 10 that approximates the stiffness of a solid ring of core material. In this regard, it is preferred that the cores 16 and the spacers 18A and 18B be made from materials having the same or substantially the same modulus of elasticity.

It should be appreciated that by providing the shims 32, 49 with a selectable width W, the circumferential preload in the ring 19 can be provided within the predetermined range without necessarily requiring overly burdensome manufacturing tolerances for the cores 16, the spacers 18B, and the spacer pieces 30.

Further, it should also be appreciated that the multi-piece spacer 18A allows for magnetic isolation and a magnetic bearing, without necessarily requiring welding of non-magnetic spacers to the actuator cores of the magnetic bearing.

We claim:

1. A magnetic bearing for supporting a rotor for rotation about an axis, the magnetic bearing comprising:
    a plurality of actuator cores spaced circumferentially about the axis, each of the cores having a pair of circumferentially spaced end surfaces; and
    a plurality of non-magnetic spacers, each of the spacers positioned between the end surfaces of adjacent pairs of the cores and having an interference fit with said end surfaces to form a circumferentially preloaded ring of the cores and spacers centered on the axis, at least one of the spacers being a multi-piece assembly including a shim having a width selected to provide the circumferential preload within a predetermined range.

2. The magnetic bearing of claim 1 wherein the shim has a pair of parallel side surfaces spaced by the width.

3. The magnetic bearing of claim 1 wherein each of the end surfaces nominally lies in a corresponding radial plane containing the axis.

4. The magnetic bearing of claim 3 wherein the shim has a pair of parallel side surfaces spaced by the width.

5. The magnetic bearing of claim 4 wherein the multi-piece assembly further includes a pair of spacer pieces, each spacer piece having a first surface circumferentially spaced from a second surface, the first surface mating with one of the end surfaces, the second surface mating with one of the side surfaces.

6. The magnetic bearing of claim 1 wherein the spacers and the cores have circumferential stiffness of the same magnitude.

7. The magnetic bearing of claim 1 further comprising a ring surrounding the cores and spacers and engaging radially outer surfaces of the cores and spacers.

8. The magnetic bearing of claim 1 wherein the shim is a cylindrical pin.

9. The magnetic bearing of claim 8 wherein the multi-piece assembly further comprises a pair of spacer pieces, each spacer piece having a first surface circumferentially spaced from a second surface, the first surface mating with one of the end surfaces, the second surface including a groove that receives the cylindrical pin.

10. The magnetic bearing of claim 9 wherein each of the grooves extends parallel to the axis and has a concave transverse cross-section.

* * * * *